(12) United States Patent
Smith (10) Patent No.: US 10,915,715 B2
(45) Date of Patent: Feb. 9, 2021

(54) SYSTEM AND METHOD FOR IDENTIFYING AND TAGGING ASSETS WITHIN AN AV FILE

(71) Applicant: Disney Enterprises, Inc., Burbank, CA (US)

(72) Inventor: Tony R. Smith, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/506,949

(22) Filed: Jul. 9, 2019

(65) Prior Publication Data

US 2019/0332829 A1   Oct. 31, 2019

Related U.S. Application Data

(63) Continuation of application No. 15/061,739, filed on Mar. 4, 2016, now Pat. No. 10,452,874.

(51) Int. Cl.
| | |
|---|---|
| *G06K 7/10* | (2006.01) |
| *G11B 27/031* | (2006.01) |
| *H04N 21/472* | (2011.01) |
| *H04N 21/235* | (2011.01) |
| *H04N 21/8547* | (2011.01) |
| *H04N 21/234* | (2011.01) |
| *H04N 21/233* | (2011.01) |
| *H04N 21/81* | (2011.01) |
| *H04N 21/858* | (2011.01) |

(Continued)

(52) U.S. Cl.
CPC ........ *G06K 7/10297* (2013.01); *G11B 27/031* (2013.01); *G11B 27/11* (2013.01); *H04N 21/233* (2013.01); *H04N 21/2353* (2013.01); *H04N 21/23418* (2013.01); *H04N 21/47205* (2013.01); *H04N 21/8153* (2013.01); *H04N 21/854* (2013.01); *H04N 21/858* (2013.01); *H04N 21/8547* (2013.01)

(58) Field of Classification Search
CPC .. G11B 27/031; G11B 27/11; G06K 7/10297; H04N 21/47205; H04N 21/2353; H04N 21/8547; H04N 21/23418; H04N 21/233; H04N 21/8153; H04N 21/858; G06Q 10/08
See application file for complete search history.

(56) References Cited

U.S. PATENT DOCUMENTS

5,963,134 A  10/1999  Bowers
6,072,479 A   6/2000  Ogawa
(Continued)

*Primary Examiner* — David E Harvey
(74) *Attorney, Agent, or Firm* — Patterson + Sheridan, LLP (57) ABSTRACT

A system for identifying, tagging, and displaying one or more assets within an audio visual (AV) file includes an asset tagging server, an asset tag acquisition device, and a database, wherein the asset tag acquisition device includes an asset identification engine configured to receive an asset identification data set and generate an asset tag data file that includes an asset tag corresponding to each asset. The asset tagging server is configured to receive, from an AV capture device, an AV file that includes an AV representation of each asset and corresponding timestamp data, and store, in the database, an AV asset tag data file comprising the beginning timestamp, the ending time stamp, and the set of asset tags.

16 Claims, 8 Drawing Sheets

(51) Int. Cl.
  *H04N 21/854* (2011.01)
  *G11B 27/11* (2006.01)

(56) References Cited

U.S. PATENT DOCUMENTS

| | | |
|---|---|---|
| 7,388,496 B1 | 6/2008 | Halcrow |
| 7,551,849 B1 | 6/2009 | Abad |
| 7,834,916 B2 | 11/2010 | Shibata |
| 7,884,860 B2 | 2/2011 | Morioka |
| 7,929,808 B2 | 4/2011 | Seaman |
| 8,208,792 B2 | 6/2012 | Morioka |
| 8,215,514 B2 | 7/2012 | Kline |
| 8,219,558 B1 | 7/2012 | Trandal |
| 8,239,359 B2 | 8/2012 | Barsook |
| 8,330,823 B2 | 12/2012 | Gordon |
| 8,341,525 B1 | 12/2012 | Achour |
| 8,451,832 B2 | 5/2013 | Takai |
| 8,494,231 B2 | 7/2013 | Folta |
| 8,538,820 B1 | 9/2013 | Migdal |
| 8,587,672 B2 | 11/2013 | Wallace |
| 8,849,041 B2 | 9/2014 | Neumann |
| 8,988,611 B1 | 3/2015 | Terry |
| 9,154,761 B2 | 10/2015 | Sipe |
| 9,210,365 B2 | 12/2015 | Kreiner |
| 9,440,152 B2 | 9/2016 | Thompson |
| 9,443,284 B1 | 9/2016 | Wang et al. |
| 9,467,723 B2 | 10/2016 | Osminer |
| 9,558,407 B1 | 1/2017 | McSorley |
| 9,600,499 B2 | 3/2017 | Kutaragi |
| 9,626,539 B2 | 4/2017 | Johannesen |
| 9,668,002 B1 | 5/2017 | Baron |
| 2002/0042923 A1 | 4/2002 | Seaman |
| 2002/0097983 A1 | 7/2002 | Wallace |
| 2003/0223733 A1* | 12/2003 | Chang ............... G08B 13/1961 386/230 |
| 2004/0260669 A1 | 12/2004 | Fernandez |
| 2006/0087925 A1 | 4/2006 | Takai |
| 2006/0178902 A1 | 8/2006 | Vicars |
| 2006/0236338 A1 | 10/2006 | Shimoda |
| 2006/0236368 A1 | 10/2006 | Raja |
| 2006/0253491 A1 | 11/2006 | Gokturk |
| 2006/0277454 A1 | 12/2006 | Chen |
| 2006/0282342 A1 | 12/2006 | Chapman |
| 2007/0078774 A1 | 4/2007 | Brown |
| 2007/0100713 A1 | 5/2007 | Del Favero |
| 2007/0143123 A1 | 6/2007 | Goldberg |
| 2007/0146360 A1 | 6/2007 | Clatworthy |
| 2007/0174130 A1 | 7/2007 | Seeley |
| 2008/0028312 A1 | 1/2008 | Alvarez |
| 2008/0033847 A1 | 2/2008 | McIntosh |
| 2008/0155422 A1 | 6/2008 | Manico |
| 2008/0301182 A1* | 12/2008 | Liu ................ G08B 13/19669 |
| 2009/0103887 A1 | 4/2009 | Choi |
| 2009/0259623 A1 | 10/2009 | Mooneyham |
| 2009/0307258 A1 | 12/2009 | Priyadarshi |
| 2010/0042642 A1 | 2/2010 | Shahraray |
| 2010/0060455 A1 | 3/2010 | Frabasile |
| 2010/0103173 A1 | 4/2010 | Lee |
| 2011/0252013 A1* | 10/2011 | Lempel ............... G06F 16/338 707/706 |
| 2011/0307527 A1 | 12/2011 | Roenning |
| 2012/0079380 A1 | 3/2012 | Tsai |
| 2012/0089643 A1 | 4/2012 | Hodgkinson |
| 2012/0239689 A1 | 9/2012 | Asikainen |
| 2013/0067333 A1 | 3/2013 | Brenneman |
| 2013/0139058 A1* | 5/2013 | Kato .................. G11B 27/329 715/716 |
| 2013/0205336 A1 | 8/2013 | Ballai |
| 2013/0228624 A1 | 9/2013 | Byrd |
| 2013/0307988 A1* | 11/2013 | Hansen ................. G07C 1/24 348/157 |
| 2013/0330059 A1 | 12/2013 | Matsumoto |
| 2013/0343792 A1 | 12/2013 | Rav-Acha |
| 2014/0130102 A1 | 5/2014 | Iijima |
| 2014/0164373 A1 | 6/2014 | Belyaev |
| 2014/0233918 A1 | 8/2014 | Roberts |
| 2014/0278360 A1 | 9/2014 | Clark |
| 2014/0331246 A1 | 11/2014 | Shneiderman |
| 2015/0063781 A1 | 3/2015 | Silverman |
| 2015/0172787 A1 | 6/2015 | Geramifard |
| 2015/0177953 A1 | 6/2015 | Khalsa |
| 2015/0205762 A1 | 7/2015 | Kulikowska |
| 2015/0227780 A1 | 8/2015 | Tussy |
| 2015/0302067 A1 | 10/2015 | Eluard |
| 2015/0319506 A1 | 11/2015 | Kansara |
| 2016/0180468 A1 | 6/2016 | Buss |
| 2016/0192125 A1 | 6/2016 | Leland |
| 2016/0350609 A1 | 12/2016 | Mason |
| 2017/0076393 A1 | 3/2017 | Cohen |
| 2017/0109391 A1 | 4/2017 | Rosen |
| 2017/0255820 A1 | 9/2017 | Liu |
| 2017/0321372 A1 | 11/2017 | Powell |
| 2018/0136828 A1 | 5/2018 | Threewits |

* cited by examiner

SYSTEM AND METHOD FOR IDENTIFYING AND TAGGING ASSETS WITHIN AN AV FILE

CROSS-REFERENCE TO RELATED APPLICATIONS

The present application is a continuation of U.S. patent application Ser. No. 15/061,739, filed Mar. 4, 2016, the content of which is incorporated herewith in its entirety.

TECHNICAL FIELD

The disclosed technology relates generally to media content acquisition, editing, and playback content playback, and more particularly, some embodiments relate to automating identification and display of audio-visual content based on assets captured within AV data scenes.

BACKGROUND

Creating a movie, television show, or other audio-visual content may involve capturing multiple "takes" to capture desired content that can later be edited together into a desired final cut. For example, in legacy entertainment video film (i.e., using analog audio-visual media), a film or video camera may capture a scene involving several assets (e.g., actors, props, backdrops, etc.) in a "first take." A director may then determine that one or more additional "takes" are required to correct issues in the "first take," to acquire different video or film perspectives or angles of the scene, or just to provide redundant content. Later, in an editing process, the multiple takes from multiple scenes can be edited together by cutting and splicing film segments to eventually create a "final cut" of the edited film. When using digital media, editors may virtually "cut," "splice," or otherwise edit digital media files using software programs to manipulate the digital data. As used herein, the terms "take," "takes," "scene," "cut," and "final cut" are terms of art in the entertainment industry that apply to both analog and digital media, and would be understood by a person of ordinary skill in the art.

As digital media formats have become prevalent, the amount of available content created, for example, due to capturing multiple takes of a single scene, has increased. This increase in available content in a single audio-visual production has increased the complexity, time, and cost involved in editing that content because directors, editors, or other users of the content may have difficulty recalling the specific details of any given scene (i.e., which human assets, physical assets, or other content was incorporated into the scene). Accordingly, audio-visual data from individual scenes or takes may need to be viewed to catalog the details of the scene and identify similar takes or scenes during the review and editing process. This increased complexity related to acquiring, storing, displaying, and editing digital video scenes impacts the complexity of AV data display and the editing process.

BRIEF SUMMARY OF EMBODIMENTS

According to various embodiments of the disclosed technology, systems and methods for automating identification and display of audio visual (AV) content based on assets included in a production scene or take and reproduced within captured AV data sets are described.

According to various embodiments of the disclosed technology, a system is provided for correlating AV files to asset tags that correspond to assets used in a particular scene or take. For example, the assets may be actors, actresses, props, scene fixtures, script elements, locations, members of the production crew, costume elements, or other properties or elements relating to a particular scene or take, e.g., in a movie, television show, or other production.

Some embodiments include an asset tagging device capable of identifying the assets and assigning a digital identification tag (referred to herein as an asset tag) to the asset using manual input from a user, Radio Frequency Identification (RFID), barcodes, facial recognition, voice recognition, or other methods of asset identification as would be known in the art.

Some embodiments include a user interface configured to display AV file or thumbnail images relating the AV files, organized using groups or filters based on identified asset tags. For example, a user may initiate a search for each AV file that includes scenes or takes involving a particular actor, actress, costume, prop, set element, or other asset. The user interface may then facilitate editing the selected scenes, interacting with the selected scenes, or providing additional tags in the form of comments, rankings, or other user input to facilitate collaboration with other users.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments disclosed herein are directed to media content acquisition, editing, and content playback, and more particularly, to automating identification and display of audio-visual content based on assets captured within AV data scenes.

In one embodiment, a system for identifying and tagging one or more assets within an AV file includes an asset tagging server, an asset tag acquisition device, and a database. The AV file may be a digital video file, a digital audio file, or other types of digital multimedia content files as known in the art. The asset tag acquisition device may include an asset identification engine, the asset identification engine configured to receive an asset identification data set and generate an asset tag data file comprising an asset tag corresponding to each asset. The asset tagging server may include a processor and a computer readable media with a software program embedded thereon.

The software program may be configured to receive an AV file from an AV capture device. For example, the AV capture device may be a digital video camera, a digital audio recorder, or other digital multimedia content capture device as known in the art. The AV file may include an AV representation of each asset, a beginning timestamp, and an ending timestamp.

The software program may further be configured to receive, from the asset identification engine, the asset tag data file corresponding to the AV file, and store, in the database, an AV asset tag data file comprising the beginning timestamp, the ending time stamp, and the set of asset tags.

Figure 1:
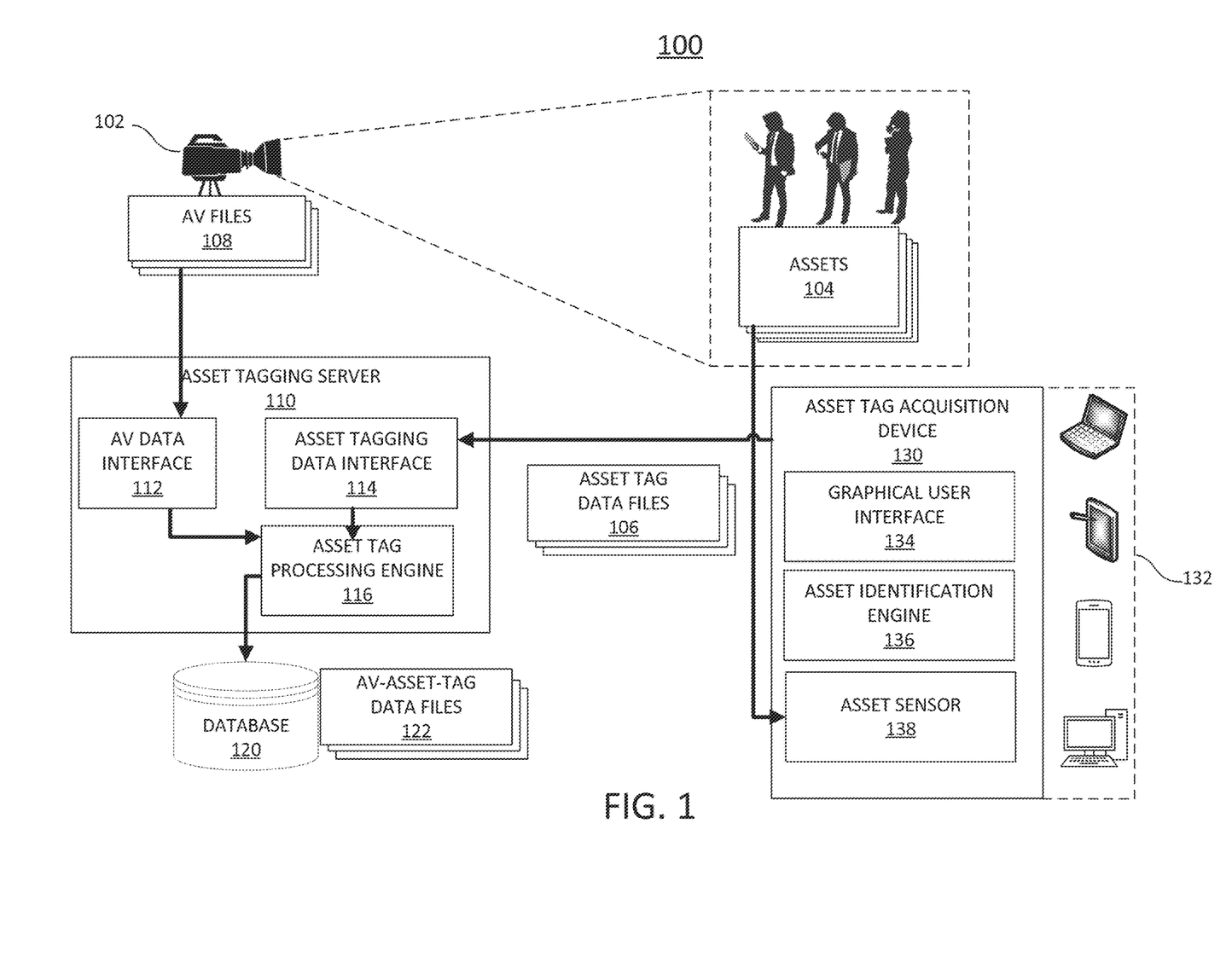
FIG. 1 is a block diagram illustrating an example system for identifying and tagging assets within AV data sets, consistent with embodiments disclosed herein.

FIG. 1 is a block diagram illustrating an example system for identifying and tagging assets within AV data sets. Referring to FIG. 1, AV capture device 102 may acquire AV data of a scripted or unscripted scene and take. For example, AV capture device 102 may be a digital video camera, film camera, video camera, or other AV data capture device as known in the art. AV capture device 102 may also be an audio data capture device such as a microphone, tape recorder, digital audio recorder, or other audio capture device known in the art.

The scene being recorded, video-taped, filmed, or otherwise captured by AV capture device 102 may be setup with a plurality of assets 104. Assets 104 may include human assets such as the actors or extras participating in the scene or directors, writers, camera men, production assistants, or other persons involved with creating the scene. Assets 104 may also include environmental assets such as the location where the scene was filmed, the scripted location that the scene was intended to portray, the time of day the scene was filmed, the scripted time and day for the scene, lighting conditions within the scene, weather conditions at the location where the scene was filmed, or other environmental conditions, actual or scripted, at the location where the scene was filmed. Assets 104 may also include physical assets such as props portrayed in the scene, articles of clothing worn by the actors or extras portrayed in the scene, set pieces, or other physical items captured in the recording of the scene by AV capture device 102. Assets 104 may also include auditory assets such as words spoken by the actors, music, sound effects, background noises, other sounds captured in the audio recording captured by AV capture device 102, or scripted words, sounds, music, or sound effects, whether or not captured by AV capture device 102. Assets 104 may also capture human emotion assets, such as a particular emotion portrayed by an actor or mood of the scene.

Still referring to FIG. 1, a system for identifying and tagging assets within AV data sets may also include an asset tagging server 110, database 120, and an asset tag acquisition Device 130.

Asset tagging server 110, for example, may include one or more processors and one or more computer readable media, each computer readable media configured with one or more software applications embedded thereon. For example, asset tagging server 110 may include AV data interface 112, asset tagging data interface 114, and asset tag processing engine 116. In some embodiments, the one or more software applications may be configured as AV data interface 112, asset tagging data interface 114, and asset tag processing engine 116. In other embodiments, AV data interface 112, asset tagging data interface 114, or asset tag processing engine 116 may be configured as a stand-alone or special purpose computer component.

AV data interface 112 may be configured to receive AV data, in the form of AV files 108, from AV capture device 102. In some examples, each AV file 108 may include video data, audio data, and corresponding time stamp data from AV capture device 102. AV data interface 112 may receive AV data from AV capture device 102 over TCP/IP, HTTP, HTTPS, FTP, sFTP, or other known network communications or data transfer protocols. In some examples, AV files 108 may be compressed or encoded by AV capture device 102 using known video compression or encoding protocols prior to transmission to AV data interface 112, such as H.264, MPEG, or other known video compression or encoding protocols. AV data interface 112 may then decompress or decode the AV data files 108. In some examples, actual video and audio data may be excluded from AV files 108. In such examples, AV files 108 still include timestamp data to identify, at least, the beginning and ending timestamp for each AV data set corresponding to an individual scene and take.

Asset tagging data interface 114 may receive asset tag data files 106 from asset tag acquisition device. For example, each asset tag data file may include one or more asset tags, each asset tag corresponding to an asset 104 from the current scene and take, as identified by asset tagging server 110 using corresponding beginning and ending timestamps included in a corresponding AV file 108. Asset tagging data interface 114 may receive asset tag data files 106 from asset tag acquisition device 130 over TCP/IP, HTTP, HTTPS, FTP, sFTP, or other known network communications or data transfer protocols.

Asset tag processing engine 116 may receive and process AV files 108 from AV data interface 112 to parse out relevant timestamps, i.e., the beginning timestamp and ending timestamp for the scene and take currently being processed. Asset tag processing engine 116 may also receive and process asset tag data files 106 from asset tagging data interface 114 to parse out asset tags corresponding to respective assets 104 for the current scene being processed. In some embodiments, asset tag processing engine 116 is further configured to generate an AV asset tag data file 122 that relates sets of timestamp data from AV files 108 to respective corresponding sets of asset tags parsed from asset tag data files 106. Asset tag processing engine 116 may further be configured to append additional asset tags to the AV asset tag data file 122 until the current scene and take concludes, such that a single AV asset tag data file 122 may correspond to a scene and take. Asset tag processing engine 116 may then store the AV asset tag data file 122 in database 120, and repeat the process for additional scenes and takes. In some examples, AV files 108 may also include asset tags, such as manually entered comments from a user indicating the subjective quality of the scene, or other user notes, which will also be appended to each respective AV asset tag data file 122 and stored in database 120.

In some embodiments, the asset tag acquisition device may include a user interface, and the asset identification engine may be configured to receive the asset identification data set from the user interface. Alternatively, or in addition to the user interface, the asset tag acquisition device may include an asset sensor, and the asset identification engine may be configured to receive the asset identification data set from the asset sensor. For example, the asset sensor may be a Radio Frequency Identification (RFID) receiver, and an RFID may be disposed on one or more assets. In some embodiments, an asset sensor may be the AV capture device and the asset identification engine may be further configured to identify each asset using pattern recognition or sound recognition. Such pattern recognition and sound recognition algorithms may be selected from methods of identifying patterns in video or sound files as known in the art (e.g., facial recognition, voice recognition, object recognition, etc.). The asset sensor may be a video device or system configured to identify each asset using a pattern recognition algorithm.

Asset tag acquisition device 130, for example, may include a processor and computer readable media with asset tag acquisition software embedded thereon, the processor and asset tag acquisition software residing on computing device 132. Computing device 132 may include a laptop, tablet, mobile phone, portable data assistant (PDA), workstation, terminal, server, or other computing device as known in the art. The asset tag acquisition software may be configured as graphical user interface 134 to enable a user input. The asset tag configuration software may also be configured as an asset tag identification engine 136 to enable identification and tagging of specific assets 104. Asset Tag Acquisition Device 130 may further include an asset sensor 130. For example, asset sensor 138 may include a camera, a microphone, a barcode reader, a RFID reader, a voice or sound recognition device, a pattern recognition device, a speech-to-text conversion device, or other sensors as would be known in the art. In one embodiment, asset sensor 138 may be replaced or supplemented by graphical user interface 134, which may be configured to accept user input to manually identify one or more assets 104 within a scene.

In some examples, one or more of the actors may place an RFID tag somewhere in their costume or on their person. An RFID reader, configured as asset sensor 138, may then detect the actors in a scene by receiving a signal from each RFID present in the scene and send the corresponding asset tag to asset identification engine 136. The RFID tags may also be used on physical assets such as costume pieces, props, fixtures on the set, or production crew members or cameras, to identify and tag those assets.

In other examples, asset sensor 138 may be a pattern recognition device to identify human assets and physical assets by appearance (e.g., using facial recognition, and other algorithms). In other examples asset sensor 138 may use voice recognition to identify human assets by speech. A sound sensor (e.g. a microphone), may be used to enable the voice recognition, and may also enable speech-to-text to identify words spoken in each scene in one or more languages. These words may be used as asset tags, and may also be correlated later with actual language in the script to determine any deviation. Similar sound recognition and pattern matching technology may be used to identify music, sound effects, or other sound patterns within each scene and take. In some examples, asset sensor 138 may also be a light meter to identify lighting levels, or to recognize patterns in scenery for the set, time of day, or other environmental or physical asset parameters. In some examples, asset sensor 138 may be a GPS or other location sensor to identify location. Similarly, asset tags may be manually entered, such as subjective qualifications on the scene and take quality, indicators from the script, names of actors or extras, identification of location or props. Any combination of the above asset sensor types and manual tag entries may be used with asset tag acquisition device 130 to generate a full set of asset tags.

In some embodiments, database 120 is a structured database. In other embodiments, database 120 may be an unstructured database. In some examples, one or more of AV capture device 102, asset tagging server 110, database 120, and asset tag acquisition device 130 may combine to form a physically integrated AV capture and tagging system.

In some embodiments, a system for displaying AV data sets includes a scene generation server and a database. The database may include a set of AV asset tag data files. The scene generation server may include a processor and a computer readable media with a software program embedded thereon. The software program may be configured to receive, from an editing display system, a set of asset parameters and search the database to identify one or more AV asset tag data files that correspond to the set of asset parameter. In some examples, the editing display system is configured to receive a list of relevant AV asset tag data files from the scene generation server and display the relevant AV asset tag data files in a user interface. The editing display system is configured to receive the set of asset parameters from a user interface. For example, the set of asset parameters may include human asset parameters, environmental asset parameters, physical asset parameters, auditory asset parameters, or parameters relating to other types of assets from a scene or take. The asset parameters may also include one or more pre-defined asset parameters corresponding to a user profile.

Figure 2:
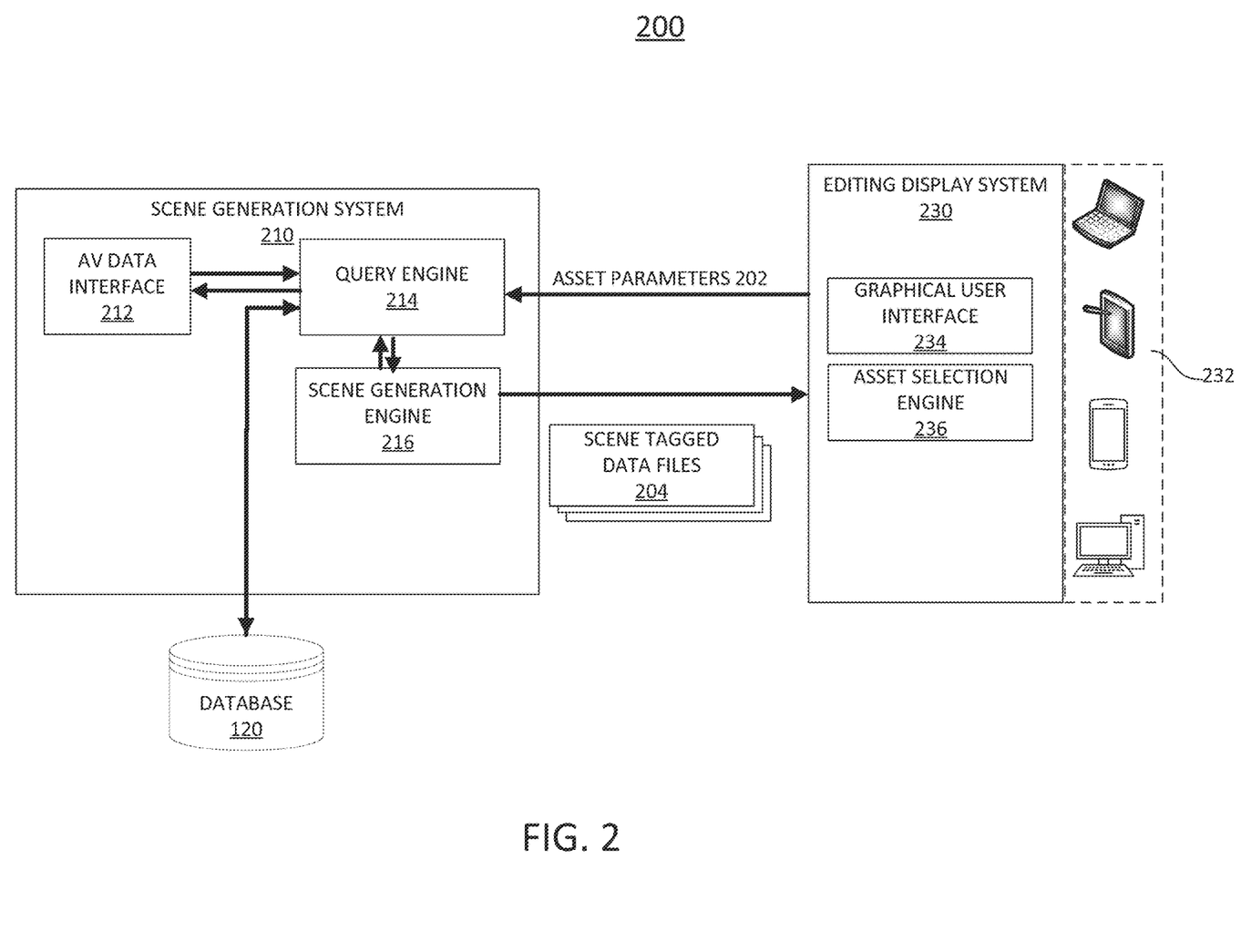
FIG. 2 is a block diagram illustrating an example system for displaying AV data sets, consistent with embodiments disclosed herein.

FIG. 2 is a block diagram illustrating an example system for displaying AV data sets. Referring to FIG. 2, a system for displaying AV data sets may include scene generation system 210 and editing display system 230. Scene generation system 210 may include one or more processors and one or more computer readable media. Each computer readable media may be configured with one or more software applications embedded thereon. For example, scene generation system 210 may include AV data interface 212, query engine 214, and scene generation engine 216. In some embodiments, the one or more software applications may be configured as AV data interface 212, query engine 214, and scene generation engine 216. In other embodiments, AV data interface 212, query engine 214, and scene generation engine 216 may be configured as a stand-alone or special purpose computer components.

For example, query engine 214 may be configured to receive a set of asset parameters 202 from editing display system 230 and generate a search query using the asset parameters 202. Query engine 214 may further receive an AV asset tag data file index from database 120 and query the AV asset tag data file index using the generated search query. Alternatively, query engine 214 may directly search database 120 using the generated search query. Using either search mechanism, query engine 214 identifies and requests relevant AV asset tag data files from database 120. For example, query engine 214 may employ a standard Boolean search string, or may employ a probabilistic search algorithm that identifies matches based on meeting a threshold relevance level. Other similarly suited search algorithms may be used as known in the art to identify relevant or closely matching AV asset tag data files from database 120. Once relevant files are identified, query engine 214 may identify corresponding AV file timestamp data and request AV files from AV data interface 212, which may pull the AV files directly from the AV capture device 102, as illustrated in FIG. 1, or may pull the AV files or corresponding thumbnail images directly from the AV asset tag data files, database 120, or other data storage location.

Scene generation engine 216 may then receive one or more AV files or thumbnails from query engine 212 along with one or more corresponding AV asset tag data files. Scene generation engine 216 may then append the thumbnail image to a corresponding AV asset tag data file to generate a scene tagged data file 204, group each scene tagged data file 204 into a set of scene tagged data files 204, and send the set of scene tagged data files 204 to editing display system 230. Scene generation engine 216 may then send specific full AV files corresponding to a scene and take selected by a user to editing display system 230.

Still referring to FIG. 2, editing display system 230 may include a processor and computer readable media with editing display software embedded thereon, the processor and editing display software residing on computing device 232. Computing device 232 may include a laptop, tablet, mobile phone, PDA, workstation, terminal, server, or other computing device as known in the art. The editing display software may be configured as graphical user interface 234 to enable a user input and to graphically display AV data in the form of selected scenes and takes filtered and grouped using asset tag data. The editing display software may also be configured as an asset selection engine 236 to enable selection of scenes and takes using search queries, in the form of one or more asset parameters 202, received from graphical user interface 234. Scene selection engine 236 may further be configured to send asset parameters 202 to scene generation system 210, and specifically to query engine 214.

In some embodiments, editing display system 230 may identify a user and user profile associated with the user. The system may then incorporate one or more pre-defined asset parameters associated with the user profile to asset parameters 202. For example, the user profile may be a director profile, a writer profile, a sound engineer profile, an editor profile, an actor profile, a custom built profile, or other profile. Query engine 214 may then correlate the user profile to a pre-defined set of asset parameters to include in the generation of the search query. In one example, a director may be interested in all scenes involving a specific production crew with a specific set of physical assets. Each search query generated by the director profile would then include those pre-defined asset parameters.

In another example, a user may access the system with a writer user profile and input specific script contents. The asset selection engine may then send asset parameters 202 to query engine 214, wherein the asset parameters 202 include specified script contents. In addition, the scene selection engine may specify a threshold level of script-to-dialog discrepancies, and query engine 214 may compare the script portions relating to one or more scenes and takes with recognized speech from the actual dialog within those scenes to identify discrepancies. For any scene and take in which the spoken dialog deviates from the script by more than a pre-defined threshold, query engine 214 will identify and select AV asset tag data files related to the identified scene and take.

In another example of a non-pre-defined search query, a user may wish to identify all scenes with a specific human asset, physical asset, environmental asset, auditory asset, or human emotion asset. Asset selection engine 236 will send respective asset parameters 202 to query engine 214, and query engine 214 will generate and execute a search query based on asset parameters 202 and retrieve AV asset tag data files and related thumbnail images from database 120 and AV capture device 102, or other storage locations. Scene generation engine 216 will then build and send scene tagged data files 204 to asset selection engine 236 by using the thumbnail images and AV asset tag data files. Scene generation engine 216 may then compile a graphical view of one or more scene tagged data files 204 by filtering and grouping the scene tagged data files based on the asset parameters 202 and the user's profile. Graphical user interface 234 may then display the graphical view, for example, in a grid with thumbnail images and related descriptions for each relevant scene tagged data file. Users may then select one or more of the scene tagged data files from which to request full AV files (e.g., to view the captured video of the scene and take), and to manipulate the video using standard audio video editing tools as known in the art.

In some examples, one or more of editing display system 230 and scene generation system 210 may combine to form a physically integrated system for displaying AV data sets.

In another embodiment, a method for identifying and tagging assets within an AV file includes receiving, from an AV capture device, an AV file comprising AV content including AV representations of one or more assets, a beginning timestamp, and an ending timestamp. The method may also include identifying, with an asset tag acquisition device, the one or more assets and generating, for each asset, a corresponding asset tag. The method may also include generating an AV asset tag data file comprising the beginning timestamp, the ending timestamp, and the corresponding asset tags and storing the AV asset tag data file in a database.

Figure 3:
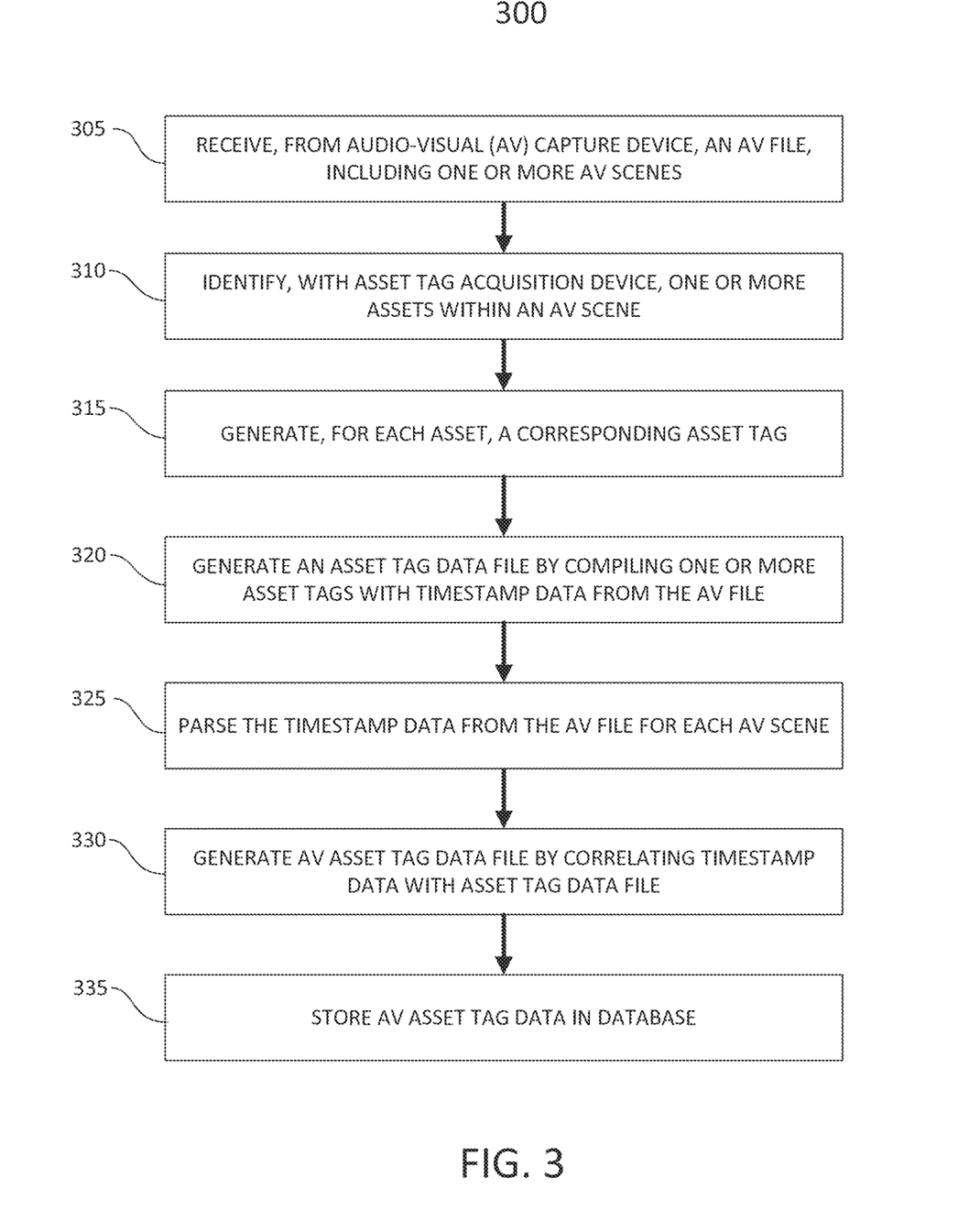
FIG. 3 is a flow chart illustrating an example method for identifying and tagging assets within AV data sets, consistent with embodiments disclosed herein.

FIG. 3 is a flow chart illustrating an example method for identifying and tagging assets within AV data sets. Referring to FIG. 3, a method for identifying and tagging assets within AV data sets 300 may include receiving, from an AV capture device (e.g., AV capture device 102 illustrated in FIG. 1), an AV file that includes one or more AV scenes and takes at step 305. Method 300 may also include identifying, with an asset tag acquisition device (e.g., asset tag acquisition device 130 illustrated in FIG. 1), one or more assets within an AV scene and take at step 310. For example, the AV assets may include human assets, environmental assets, physical assets, auditory assets, human emotion assets, or other assets that may be related to the creation of the AV file as would be known in the art.

Some embodiments of method 300 may include generating, for each asset (e.g., by using asset identification engine 136 illustrated in FIG. 1), a corresponding asset tag and generating an asset tag data file by compiling asset tags and corresponding timestamp data from the AV file at steps 315 and 320, respectively. For example, an asset tag data file may include beginning and ending timestamps from the AV file of the current scene and take along with asset parameters relating to specific assets used in the creation of the scene and take (e.g., the actors, props, set fixtures, etc.). In some examples, instead of associating asset tags with AV files in real time, the AV files may first be captured and stored, and then subsequently replayed using an asset tag acquisition device to view and tag the assets found within the AV file. In some embodiments, real-time tagging may generate some asset tags initially, and then may be subsequently supplemented with additional asset tags during a replay of the AV file. In either case, an asset tag data file will be created or appended to and stored by asset tagging server 110.

Still referring to FIG. 3, method 300 may also include parsing timestamp data from an AV file currently being tagged at step 325 and generating an AV asset tag data file by correlating timestamp data with each asset tag data file at step 330. Method 300 may also include storing the AV asset tag data files in a database (e.g., database 120 from FIG. 1 or FIG. 2), or other storage location as would be known in the art.

In some examples, each asset is selected from the group consisting of human assets, physical assets, environmental assets, auditory assets, and human emotion assets. Identifying the one or more assets may include receiving an RFID signal from an RFID tag disposed on each asset, executing a pattern or voice recognition algorithm on the AV file, accepting input from a user interface, or performing other asset identification techniques as would be known in the art.

In some embodiments, a method for displaying AV data sets may include receiving, from an editing display system, a set of asset parameters and generating an asset tag query based on the set of asset parameters. The method may also include generating a list of relevant AV asset tag data files based on the asset tag query and displaying, on a user interface, one or more AV asset tag data files selected from the list of relevant AV tag data files.

In some examples, the displaying of one or more AV asset tag data files includes displaying a thumbnail image corresponding to each AV tag data file. The method may also include receiving, from the user interface, one or more AV asset tag data file selections and generating, for each AV asset tag data file selection, a scene tagged AV file, wherein the scene tagged AV file comprises an asset tag data file and an AV file corresponding to the asset tag data file. The method may further include replaying, on the user interface, at least one of the AV files.

In some examples, the displaying one or more AV asset tag data files further includes selecting a group of AV asset tag data files that correspond to at least one of the asset parameters, arranging one or more graphic windows in a grid pattern within the user interface, and displaying a thumbnail image corresponding to an AV asset tag data file from the group inside each graphic windows.

Figure 4:
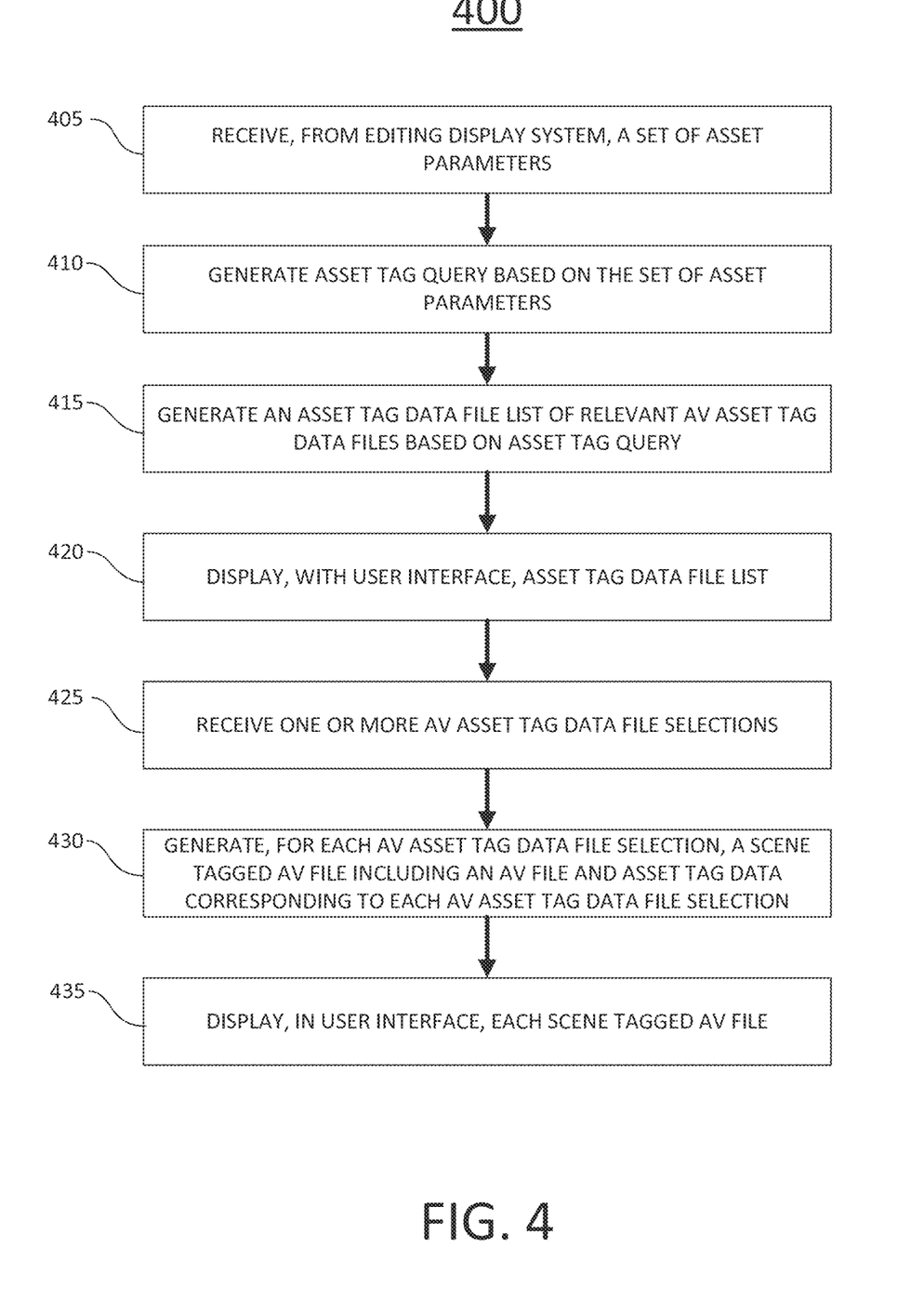
FIG. 4 is a flow chart illustrating an example method for displaying AV data sets, consistent with embodiments disclosed herein.

FIG. 4 is a flow chart illustrating an example method for displaying AV data sets. Referring to FIG. 4, a method for displaying AV data sets 400 may include receiving, from an editing display system (e.g., editing display system 230 illustrated in FIG. 2) a set of asset parameters. For example, a user may input desired search parameters into a graphical user interface (e.g., graphical user interface 234 illustrated in FIG. 2) to identify desired scenes and takes at step 405 (e.g., by human assets, environmental assets, physical assets, auditory assets, human emotion assets, or other search criteria relevant to the desired scene and take). Method 400 may further include generating an asset tag query based on the set of asset parameters and generating an asset tag data file list of relevant AV asset tag data files based on the generated asset tag query at steps 410 and 415, respectively.

For example, the asset tag query may be a standard Boolean search string, a natural language search string, or may be a relevance-based searched to return results based on the relevance of each AV asset tag data file to the selected asset parameters. Other search algorithms as known in the art may be employed to search for AV asset tag data files relevant to the selected asset parameters. In some examples, a user profile associated with the searching user (i.e., director profile, writer profile, editor profile, sound engineer profile, actor profile, etc.) may be associated with predefined asset parameters, in addition to those asset parameters selected by the user.

Still referring to FIG. 4, method 400 may also include displaying, with a user interface (e.g., graphical user interface 234) an asset tag data file list at step 420. The asset tag data file list may be displayed in graphical format using thumbnail images extracted from AV files associated with each asset tag data file. A user may then select one or more AV asset tag data file selections at step 425. Method 400 further includes generating, for each AV asset tag data file selection, a scene tagged AV file including an AV file and asset tag data corresponding to each AV asset tag data file selection at step 430 and displayed in the graphical user interface at step 435. For example, based on the user's selections, full AV files may be displayed within the graphical user interface.

Figure 5:
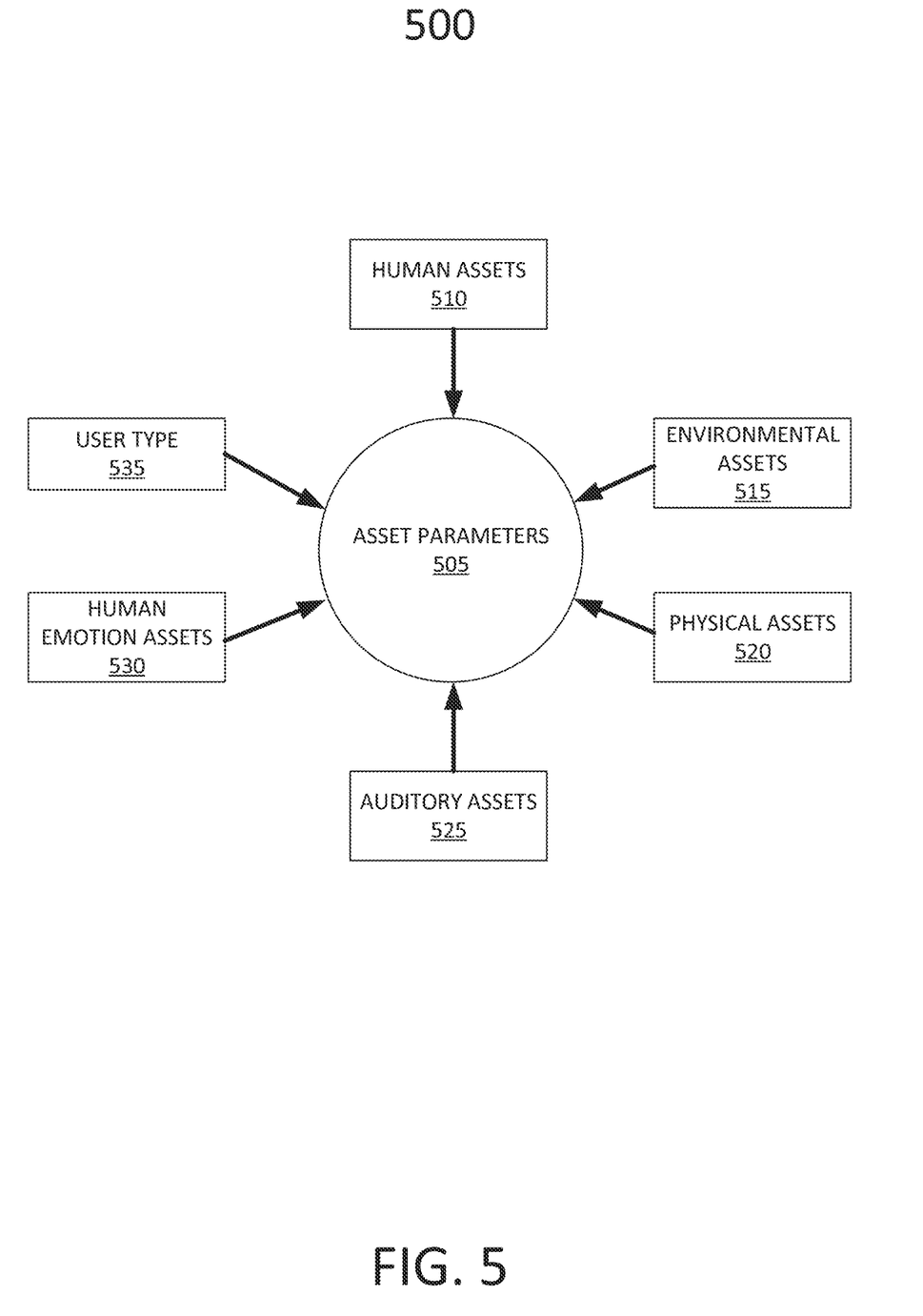
FIG. 5 illustrates examples of asset parameters used for identifying and tagging assets within AV data sets and displaying those AV data sets, consistent with embodiments disclosed herein.

FIG. 5 illustrates examples of asset parameters used for identifying and tagging assets within AV data sets and displaying those AV data sets. As used herein, asset parameters 505 include human assets 510, environmental assets 515, physical assets 520, auditory assets 525, human emotion assets 530, or other assets as would be appreciated by one of ordinary skill in the art.

For example, human assets 510 may include actors, directors, writers, extras, cameramen, producers, costume designers, or any other personnel that may be associated with a particular scene or take. environmental assets 515 may include lighting conditions, time of day, location, or other environmental conditions associated with the scene or take. Environmental assets may also include visual text or captions that are included in the AV file. Physical assets 520 may include props, set fixtures, costumes, or other physical assets associated with a scene or take. Similarly, auditory assets 525 may include speech, sound effects, background noise, music or other sounds associated with a scene or take. Human emotion assets 530 may include emotional aspects associated with any human asset (e.g., whether an actor was smiling, crying, laughing, etc.)

Any of these assets may also include the actual asset as captured in the AV file as well as the scripted or intended asset. For example, a particular actor, prop, set fixture, scripted line, lighting condition, etc. may be identified in the script, and thus included as an asset, but the actual filming of the scene or take may exclude that asset. This deviation may be captured by the systems and methods disclosed herein. Asset parameters 505 may also include pre-defined asset parameters associated with a user type, which may be indicated by a user profile.

Figure 6:
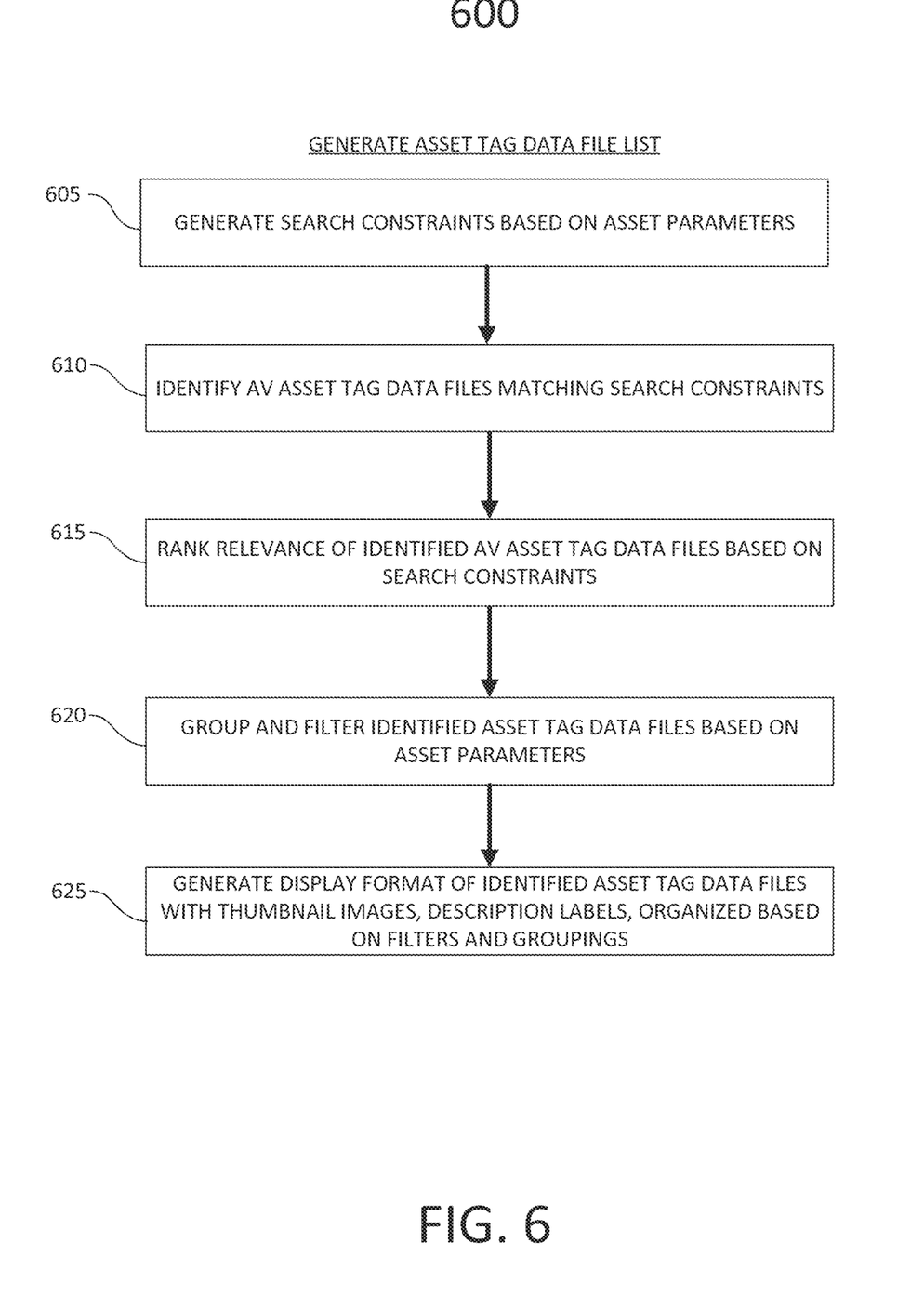
FIG. 6 is a flow chart illustrating an example method for generating an asset tag data file list, consistent with embodiments disclosed herein.

FIG. 6 is a flow chart illustrating an example method for generating an asset tag data file list. Referring to FIG. 6, a method for generating an asset tag data file list 600 may include generating search constraints based on asset parameters at step 605 and identifying AV asset tag data files matching the search constraints at step 610. Various search algorithms may be employed, as known in the art, to determine whether an AV asset tag data file matches the search constraints. In some embodiments, method 600 further includes ranking the relevance of the identified AV asset tag data files based on the search constraints at step 615. For example, the ranking may be based on the number of selected asset parameters actually present in the scene and take. In other examples, the relevance may be based on a probabilistic relevance algorithm, similar to search algorithm technology employed in standard Internet search engines.

Still referring to FIG. 6, method 600 may include grouping and filtering the identified asset tag data files based on the asset parameters at step 620. For example, a list of asset tag data files may be ranked and returned to the graphical user interface. The results may than be filtered and grouped to display only the most relevant results for a particular user profile. In one such example, a director may be concerned more with which human assets are in each scene, and thus, based on the director's user profile, the search results may be displayed by filtering only the most relevant results that include the particular human asset. Other filtering and grouping methodologies may be employed to display search results as would be known in the art. In some embodiments, method 600 further includes generating a display format of identified asset tag data files with thumbnail images and description labels, filtering, grouping, and displaying the generated display format in a graphical user interface at step 625.

Some embodiments of the systems or methods disclosed herein may be directed toward facilitating collaboration between different users. For example, a first user, such as an editor, may retrieve and display a set of AV asset tag data files in the user interface based on a set of asset parameters selected by the user, perform some editing tasks, and then add additional asset tags to one or more of the AV asset tag data files that include comments and feedback (e.g., on the quality of the take or scene, requirements for reshooting, ideas for additional scenes or takes, or questions for another user). A second user, such as a director, may then log into the system and retrieve and display the same set of AV asset tag data files, or a subset of AV asset tag data files included therein, and view the first user's comments and take appropriate action.

Figure 7:
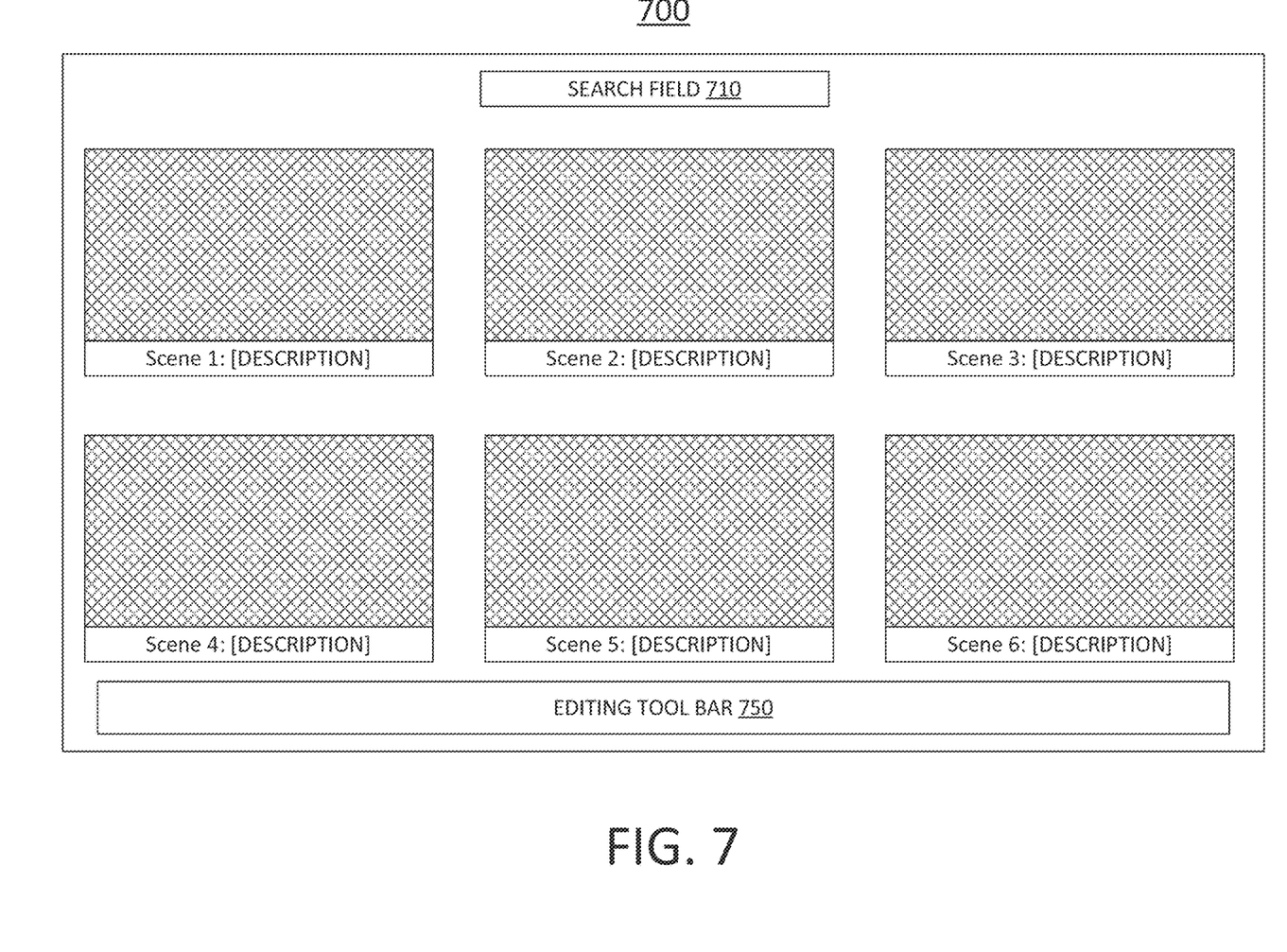
FIG. 7 illustrates an example user interface layout for displaying AV data sets, consistent with embodiments disclosed herein.

FIG. 7 illustrates an example user interface layout for displaying AV data sets. Referring to FIG. 7, an example user interface layout 700 may include a grid display. In each grid cell, an AV file or thumbnail may be displayed corresponding to a specific scene and take, along with a description field identifying the scene and take by relevant asset tags. A search field 710 may be displayed within the user interface layout 700 to enable users to enter search criteria in the form of asset tags, Boolean search strings, or natural language searches. The user interface layout may also include a set of editing tools, for example, in an editing tool bar 750, to enable editing of one or more AV files using editing methods as known in the art. The example user interface layout may be modified or displayed in many different formats, including different grid orientation, list views, collage view, or any other design layout as would be known in the art. As with any of the Figures included in this disclosure, the layout illustrated in FIG. 7 is for exemplary purposes only, and is non-limiting.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Figure 8:
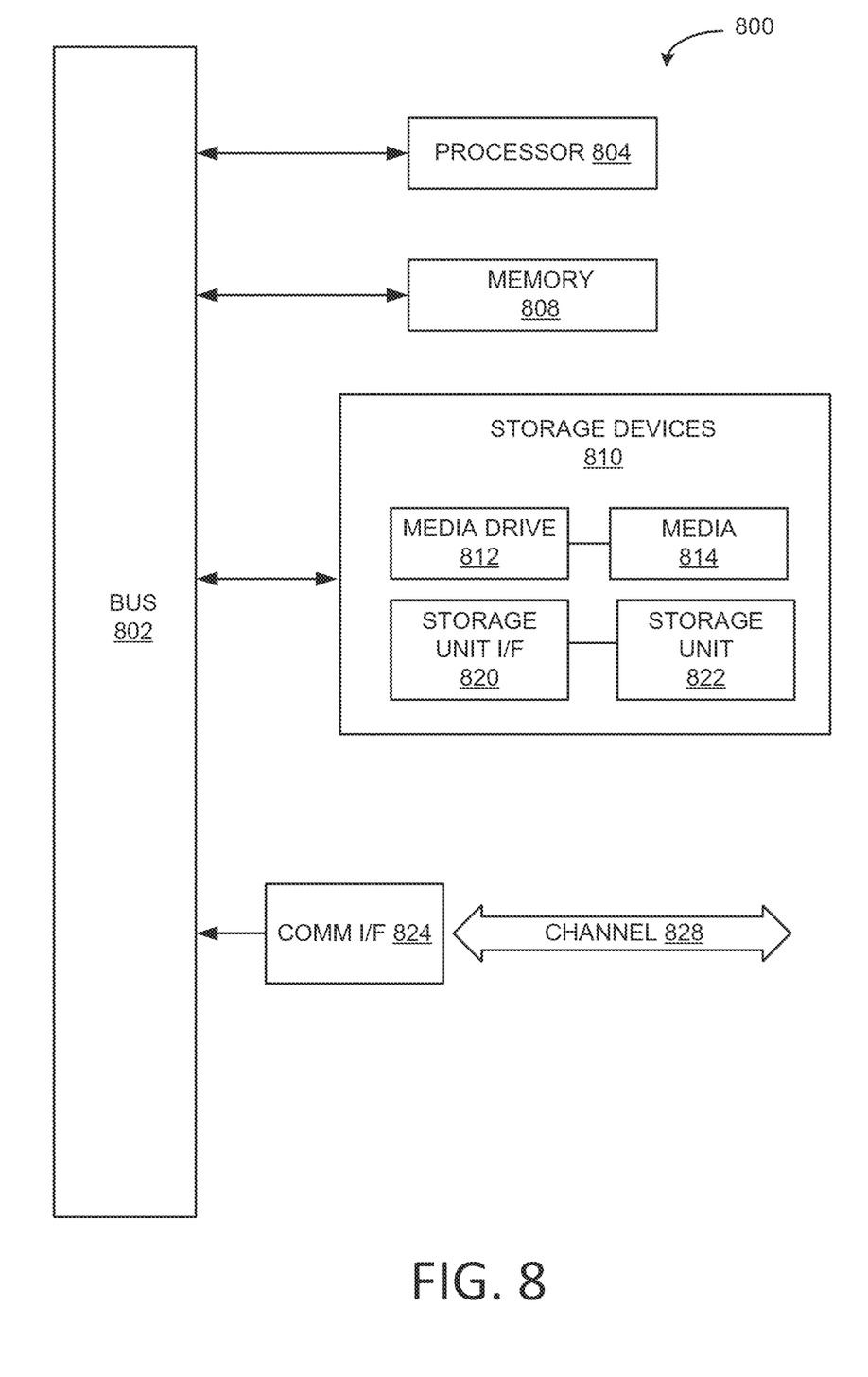
FIG. 8 illustrates an example computing component that may be used in implementing various features of embodiments of the disclosed technology.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. As used herein, the term engine may describe a collection of components configured to perform one or more specific tasks. Even though various features or elements of functionality may be individually described or claimed as separate components or engines, one of ordinary skill in the art will understand that these features and functionality can be shared among one or more common software and hardware elements, and such description shall not require or imply that separate hardware or software components are used to implement such features or functionality.

Where engines, components, or components of the technology are implemented in whole or in part using software, in one embodiment, these software elements can be implemented to operate with a computing or processing component capable of carrying out the functionality described with respect thereto. One such example computing component is shown in FIG. 8. Various embodiments are described in terms of this example-computing component 800. After reading this description, it will become apparent to a person skilled in the relevant art how to implement the technology using other computing components or architectures.

Referring now to FIG. 8, computing component 800 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing component 800 might also represent computing capabilities embedded within or otherwise available to a given device. For example, a computing component might be found in other electronic devices such as, for example, digital cameras, navigation systems, cellular telephones, portable computing devices, modems, routers, WAPs, terminals and other electronic devices that might include some form of processing capability.

Computing component 800 might include, for example, one or more processors, controllers, control components, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing component 800 or to communicate externally.

Computing component 800 might also include one or more memory components, simply referred to herein as main memory 808. For example, preferably random access memory (RAM) or other dynamic memory, might be used for storing information and instructions to be executed by processor 804. Main memory 808 might also be used for storing temporary variables or other intermediate information during execution of instructions to be executed by processor 804. Computing component 800 might likewise include a read only memory ("ROM") or other static storage device coupled to bus 802 for storing static information and instructions for processor 804.

The computing component 800 might also include one or more various forms of information storage device 810, which might include, for example, a media drive 812 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing component 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory component) and memory slot, a PCMCIA slot and card, and other fixed or removable storage units 822 and interfaces 820 that allow software and data to be transferred from the storage unit 822 to computing component 800.

Computing component 800 might also include a communications interface 824. Communications interface 824 might be used to allow software and data to be transferred between computing component 800 and external devices. Examples of communications interface 824 might include a modem or softmodem, a network interface (such as an Ethernet, network interface card, WiMedia, IEEE 802.XX, or other interface), a communications port (such as for example, a USB port, IR port, RS232 port, Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 800 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent component names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof;

the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for identifying and tagging assets within an audio visual (AV) file comprising:
   receiving, from an AV capture device, an AV file comprising AV content including AV representations of one or more assets, a beginning timestamp, and an ending timestamp;
   identifying, with an asset tag acquisition device, the one or more assets by executing a pattern recognition algorithm or voice recognition on the AV file;
   generating, for each asset of the one or more assets, a corresponding asset tag;
   generating an AV asset tag data file comprising the beginning timestamp, the ending timestamp, and the corresponding asset tags; and
   storing the AV asset tag data file in a database.

2. The method of claim 1, wherein each asset comprises a human asset, a physical asset, an environmental asset, an auditory asset, or a human emotion asset.

3. The method of claim 1, wherein identifying the one or more assets further comprises receiving an RFID signal from an RFID tag disposed on each asset.

4. The method of claim 1, wherein identifying the one or more assets further comprises receiving an asset identification data set from a user interface.

5. A system for displaying audio visual (AV) data sets, comprising:
   a scene generation server; and
   a database comprising a set of AV asset tag data files;
   wherein the scene generation server comprises a processor and a computer readable media with a software program embedded thereon, the software program when executed on the processor is configured to:
   receive, from an editing display system, a set of asset parameters;
   search the database to identify one or more AV asset tag data files that correspond to the set of asset parameters;
   display, on the editing display system, the one or more AV asset tag data files;
   receive, from the editing display system, one or more AV asset tag data file selections;
   generate, for each AV asset tag data file selection of the one or more AV asset tag data file selections, a scene tagged AV file, wherein the scene tagged AV file comprises an AV asset tag data file of the one or more AV asset tag data files and an AV file corresponding to the AV asset tag data file; and
   replay, on the editing display system, at least one of the AV files.

6. The system of claim 5, wherein the editing display system is configured to receive a list of relevant AV asset tag data files from the scene generation server and display the relevant AV asset tag data files in a user interface.

7. The system of claim 5, wherein the editing display system is configured to receive the set of asset parameters from a user interface.

8. The system of claim 5, wherein the set of asset parameters comprises human asset parameters, environmental asset parameters, physical asset parameters, auditory asset parameters, or a combination thereof.

9. The system of claim 8, wherein the set of asset parameters further comprises one or more pre-defined asset parameters corresponding to a user profile.

10. A method for displaying audio visual (AV) data sets comprising:
    receiving, from an editing display system, a set of asset parameters;
    generating an asset tag query based on the set of asset parameters;
    generating a list of relevant AV asset tag data files based on the asset tag query;
    displaying, on a user interface, one or more AV asset tag data files selected from the list of relevant AV asset tag data files;
    receiving, from the user interface, one or more AV asset tag data file selections;
    generating, for each AV asset tag data file selection, a scene tagged AV file, wherein the scene tagged AV file comprises an AV asset tag data file of the one or more displayed AV asset tag data files and an AV file corresponding to the AV asset tag data file; and
    replaying, on the user interface, at least one of the AV files.

11. The method of claim 10, wherein displaying the one or more AV asset tag data files further comprises displaying a thumbnail image corresponding to each AV asset tag data file.

12. The method of claim 11, wherein displaying the one or more AV asset tag data files further comprises selecting a group of AV asset tag data files that correspond to at least one of the asset parameters.

13. The method of claim 12, wherein displaying the one or more AV asset tag data files further comprises arranging one or more graphic windows in a grid pattern within the user interface.

14. The method of claim 13, wherein displaying the one or more AV asset tag data files further comprises displaying a thumbnail image corresponding to an AV asset tag data file from the group inside each of the one or more graphic windows.

15. The method of claim 10, wherein the set of asset parameters comprises human asset parameters, environmental asset parameters, physical asset parameters, auditory asset parameters, or a combination thereof.

16. The method of claim 15, wherein the set of asset parameters further comprises one or more pre-defined asset parameters corresponding to a user profile.

* * * * *